United States Patent [19]
Amick

[11] 3,899,146
[45] Aug. 12, 1975

[54] WIND-LAUNCHED SAILPLANE
[76] Inventor: James L. Amick, 1464 Cedar Bend Dr., Ann Arbor, Mich. 48105
[22] Filed: Mar. 27, 1974
[21] Appl. No.: 455,043

[52] U.S. Cl. .................................... 244/16; 114/39
[51] Int. Cl. .............................................. B64c 31/02
[58] Field of Search ....... 114/39, 43; 280/8; 244/16, 244/103 W, 50, 47, 45

[56] References Cited
UNITED STATES PATENTS

| 990,424 | 4/1911 | Chalfant | 244/16 |
| 1,834,858 | 12/1931 | Metzler | 244/47 |
| 3,459,146 | 8/1969 | Prior | 114/39 UX |
| 3,744,741 | 7/1973 | Christian et al. | 244/16 |
| 3,800,724 | 4/1974 | Tracy | 114/39 |
| 3,804,428 | 4/1974 | Amick | 114/43 |

Primary Examiner—Trygve M. Blix
Assistant Examiner—Paul E. Sauberer
Attorney, Agent, or Firm—Olsen and Stephenson

[57] ABSTRACT

A sailplane with wings mounted to its fuselage in a vertical V or butterfly configuration, and having steerable running gear means, so that it is able to sail on a flat surface with one wing approximately horizontal, and in this attitude the other wing extends upward at some fixed angle to the horizontal, in the range 30° to 90°. A steering system enables the pilot to adjust the yaw angle of the vehicle to obtain a desirable angle of attack of the raised wing with respect to the wind, while the craft is traveling approximately perpendicular to the wind direction. Under favorable wind conditions, aerodynamic forces on the raised wing accelerate the vehicle from rest, producing speeds in excess of the required take-off speed.

6 Claims, 4 Drawing Figures

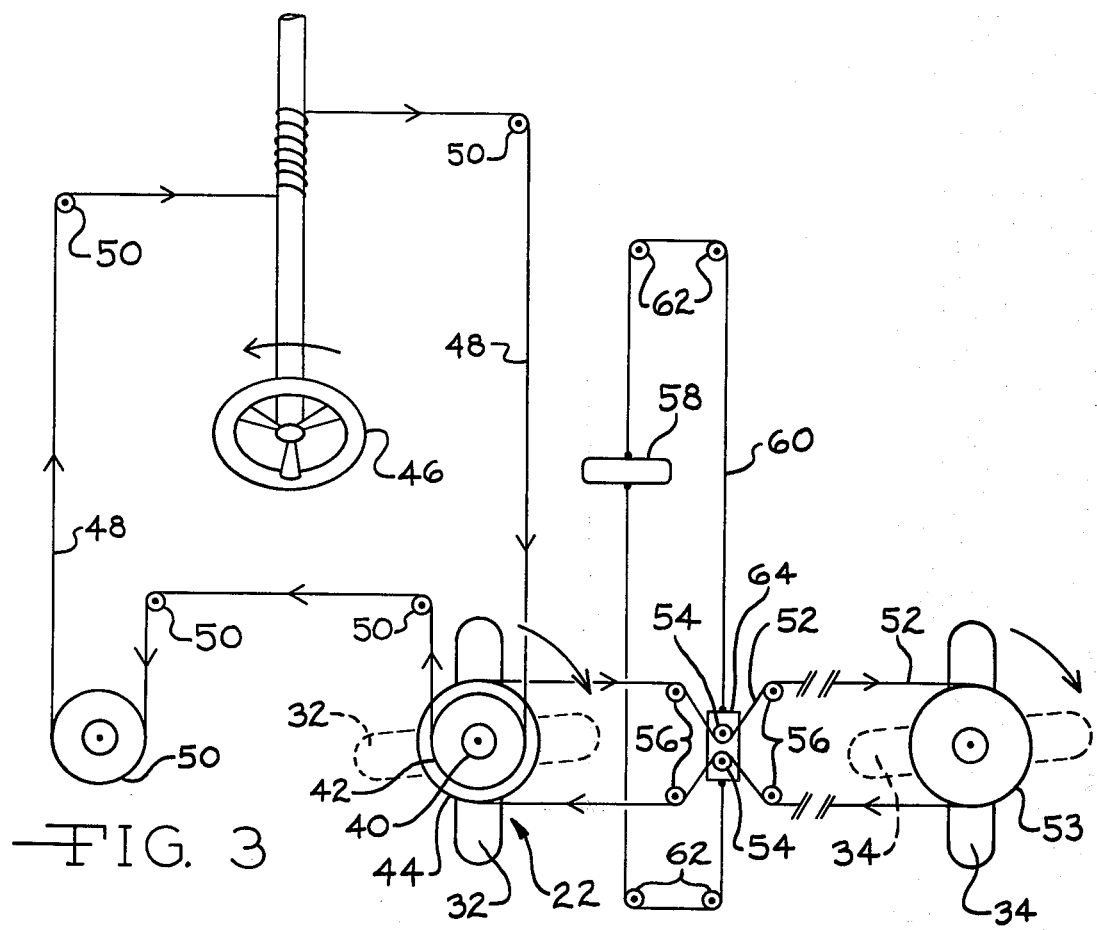
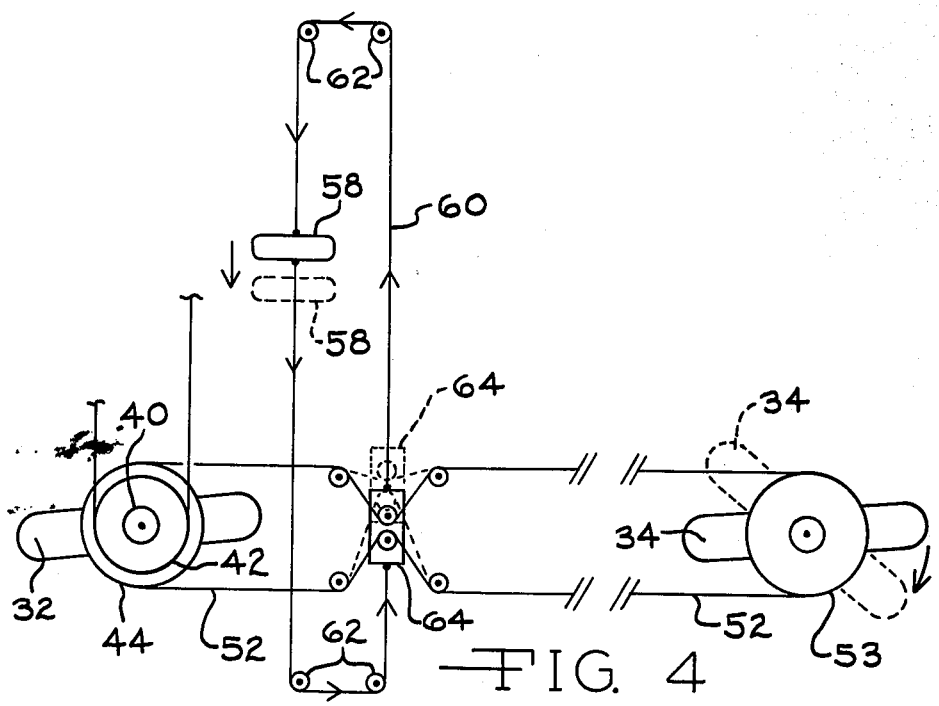

WIND-LAUNCHED SAILPLANE

BACKGROUND OF THE INVENTION

The present invention relates to improvements in sailplanes, and particularly to improvements for facilitating launching of the sailplanes.

For launching purposes, conventional sailplanes must be accelerated to flying speed by some external source of power, such as a winch, automobile tow, or airplane tow. It is desirable to be able to launch a sailplane without the manpower, fuel, and scheduling problems that are associated with these external sources.

SUMMARY OF THE INVENTION

The present invention has overcome inadequacies of the prior art and enables a sailplane to use wind power for propulsion on land or ice, and for accelerating to take-off speed. A sailplane embodying the invention also has improved cross-wind landing ability and better ground handling than conventional sailplanes. Furthermore, such a sailplane can be used as an iceboat or landsailer, with increased speed potential over present craft due to its efficient aerodynamic shape, and with the ability to fly over obstacles such as open water or fences.

According to one form of the invention a sail plane having a V-tail is provided with a large dihedral angle such that the acute angle between the plane of each wing panel and the plane of symmetry is approximately 65° (a dihedral angle of 25°). In the sailing mode a first running gear means supports the fuselage and a second running gear means supports one wing tip, with the opposite wing tip raised higher than the rest of the vehicle. A first steering means adjusts the yaw angle of the vehicle, and therefore the angle of attack of the raised wing, by controlling the angle between the axis of the vehicle and the angular direction of both running gear means, which are normally parallel. A second steering means controls the angle between the two running gear means, in order to change the course direction of the vehicle while traveling at the adjusted yaw angle. Two duplicate running gear means are provided on the opposite side of the vehicle, connected to both the said steering means, for sailing on the opposite tack.

Accordingly, it an object of the present invention to provide an improved sailplane that can be propelled by the wind to high enough speeds for take-off, with sufficient reserve speed to reach an updraft area and begin soaring.

It is a further object of this invention to provide an improved sailplane that can be used as an iceboat or landsailer, attaining higher speeds than present vehicles and having the capability of flying over obstacles on the surface.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is a schematic plan view of the yaw and steering control system for the running gear means, showing in solid lines the wheel positions for zero yaw, and in broken lines the wheel positions for a large yaw;

FIG. 4 is a schematic plan view of a portion of the control system showing in solid lines the control and wheel positions for straight-line travel, and in broken lines the positions for a right turn.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Figure 1:
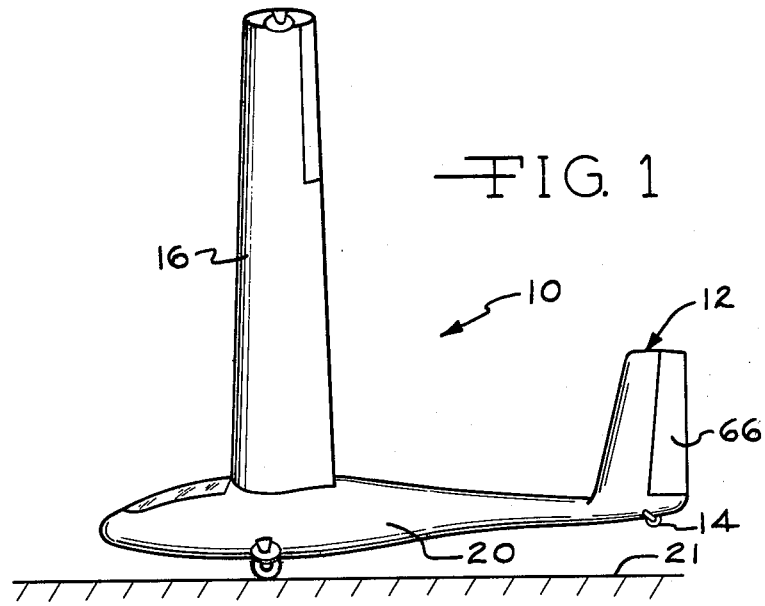
FIG. 1 is a side elevational view of a sailplane embodying the present invention in a normal position of movement at high speed on a flat surface.
Figure 2:
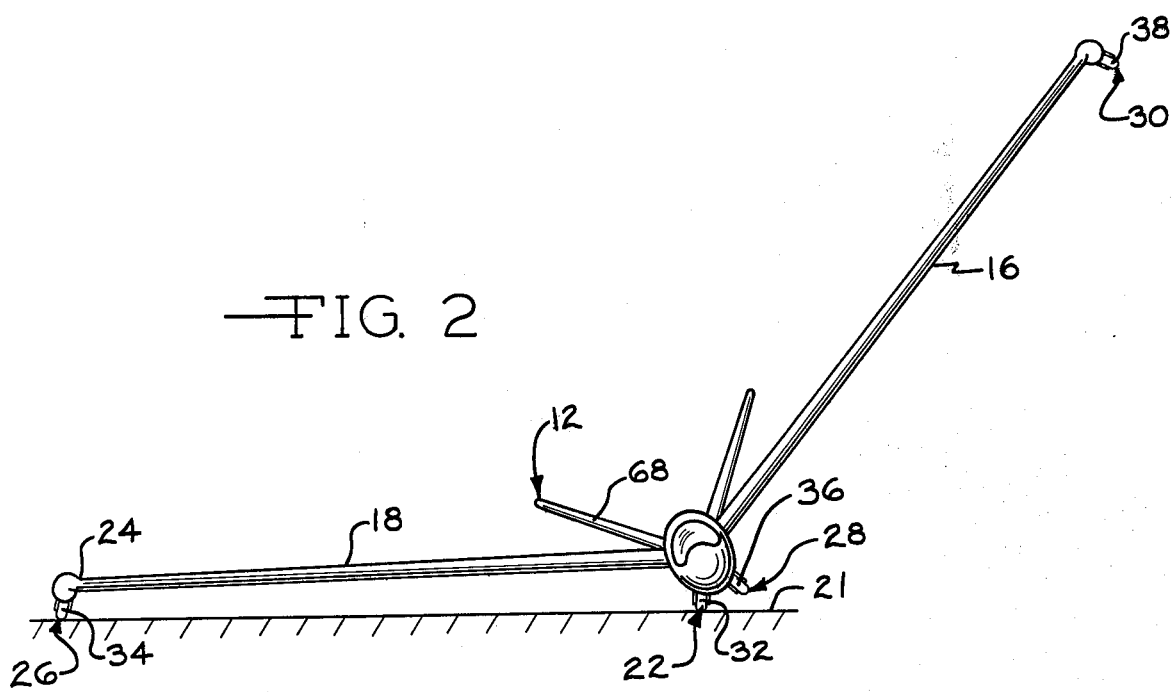
FIG. 2 is a front elevational view of the sailplane.

Referring now to the drawings, the invention will be described in greater detail. The vehicle sailplane 10 with V-tail 12 and swiveling tail wheel 14 has its wings 16 and 18 rigidly mounted at a large dihedral angle in a bilaterally symmetric arrangement, as seen in FIG. 2. The fuselage 20 is supported on surface 21 by first running gear means 22 and the wing tip 24 is supported by second running gear means 26. Duplicate running gear means 28 and 30 are provided for sailing on the opposite tack. The tail 12 is supported by swiveling tail wheel 14 at low speeds, or by the aerodynamic forces on the V-configured tail surfaces of tail 12 at higher speeds.

In the illustrated embodiment of the invention the running gear means 22, 26, 28, and 30 include the wheels 32, 34, 36, and 38, respectively, but ice runners (not shown) or the like can be substituted for the wheels, if desired, for travel on ice or another suitable form of supporting surface.

The fuselage wheel 32 is rotatably mounted on a vertical shaft 40 (FIG. 3) which is mounted in bearings (not shown). Pulleys 42 and 44 are rigidly mounted on said shaft. Yaw control wheel 46 drives cable 48 around pulleys 50 rotating pulley 42 and thereby changing the direction of wheel 32. A second cable 52 guided by pulleys 53, 54, and 56 causes the wing tip wheel 34 to follow the direction of fuselage wheel 32. Only one side of the control system is shown in FIG. 3; the other side is symmetrical and, therefore, will not be described.

In FIG. 3 the solid lines show wheels 32 and 34 in proper position for traveling straight ahead, with no yaw angle. The broken lines show the wheel positions after the yaw control wheel 46 has been rotated in a counterclockwise direction as shown by the arrow. The wheel positions shown by broken lines are typical for starting from rest, where the direction of motion should be close to that of the resultant aerodynamic force on the raised wing. When the vehicle is moving a rotation of the yaw control wheel has little effect on the direction of motion, but changes the yaw angle of the craft, moving the nose in the same direction as the top of the yaw control wheel is moved. As the vehicle speed increases the yaw angle is gradually decreased, until at the highest speeds the yaw angle becomes very small or non-existent.

For controlling the course of the vehicle under conditions of large yaw angle, such as that represented by the broken line wheel positions of FIG. 3, the handle 58 is used. Moving this handle pulls the cable 60 around the pulleys 62 and moves the block 64 on which pulleys 54 are mounted. As shown in FIG. 4, movement of block 64 causes the configuration of cable 52 to become unsymmetrical so that the direction of wheel 34 is turned with respect to that of wheel 32. Pulling handle 58 rearward produces a turn to the right. The tension in cable 52 tends to keep block 64 centered in the symmetrical position for travel in a straight line.

The sailplane 10 retains all the customary flight controls, and these are used at the higher speeds, when the yaw angle becomes small. The rudder 66 takes the place of the steering system actuated by handle 58. The elevator 68 is first used to hold the horizontal wing at a small or negative angle of attack to prevent premature take-off, and then is used to increase the angle of attack for take-off. After take-off the sailplane flight controls are used in the normal way.

Cross-wind landings are facilitated by the yaw control on the running gear. The sailplane can approach the ground in a yawed attitude, with the fuselage wheels 32 and 36 preset to the same angle, so that there is no side force at touchdown.

If desired, the embodiment described above can be modified by replacement of the two fuselage wheels with a single fuselage wheel mounted in the plane of lateral symmetry. This saves weight and complexity, but the rolling drag of the wheel is increased. A T-tail may also be substituted for the V-tail. The wings may be attached to the fuselage at any angle such that when one wing is horizontal the other wing makes a 30° to 90° angle with the horizontal. However, in a preferred form of the invention a dihedral angle of 25° is employed so that the acute angle between the planes of the two wings is 50°. The greater the dihedral angle, the better the craft will sail; but a smaller dihedral angle provides better flying abilities.

It is claimed:

1. A sailplane comprising a fuselage with wings mounted thereon, said wings having a dihedral angle within the range of 15° to 45°, running gear means connected to said fuselage, and other running gear means connected adjacent to the tips of said wings so that one of said wings can assume a horizontal attitude for support of the sailplane on a flat surface on the running gear means of said one wing and said fuselage and the other wing will then extend upward at an angle to the horizontal within the range of 30° to 90° to function as a sail for movement of the sailplane on said flat surface, said fuselage and wing tip running gear means being rotatable about generally vertical axes for steering purposes when the running gear means are supported on said flat surface, and steering gear means are connected to the running gear means for rotating said fuselage and wing tip running gear means in unison for setting the yaw angle of the sailplane when in motion on said flat surface.

2. The sailplane that is defined in claim 1, wherein the running gear means connected to said fuselage are two in number, one inclined outwardly with respect to one side of the fuselage and the other inclined outwardly with respect to the other side of the fuselage.

3. The sailplane that is defined in claim 2, wherein the angle of inclination of each outwardly inclined running gear means corresponds to the dihedral angle of its associated wing so that the inclined running gear means will be essentially in a vertical position when its associated wing assumes a horizontal attitude.

4. The sailplane that is defined in claim 1, wherein said steering control means include separate means for rotating one of said fuselage and wing tip running gear means relative to the other for steering the sailplane when in motion on said flat surface.

5. The sailplane that is defined in claim 1, wherein said wings are mounted on said fuselage at a dihedral angle of 25°.

6. A vehicle comprising a fuselage, wings rigidly attached to said fuselage in a bilaterally symmetric arrangement and at a dihedral angle sufficient to provide a net forward propulsive force from wind acting on the raised wing when the other wing is substantially horizontal, running gear means attached adjacent to the outer tip of each said wing and to said fuselage for supporting said vehicle on a flat surface with either of said wings substantially horizontal, and steering means controlling said fuselage running gear means so as to maintain a desired angle between the direction of motion and a horizontal reference line in the plane of lateral symmetry of said vehicle.

* * * * *